US006715091B1

United States Patent
Kundu

(10) Patent No.: US 6,715,091 B1
(45) Date of Patent: Mar. 30, 2004

(54) SYSTEM FOR REARRANGING PLURALITY OF MEMORY STORAGE ELEMENTS IN A COMPUTER PROCESS TO DIFFERENT CONFIGURATION UPON ENTRY INTO A LOW POWER MODE OF OPERATION

(75) Inventor: Sandip Kundu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/546,096

(22) Filed: Apr. 10, 2000

(51) Int. Cl.[7] .............................................. G06F 1/30
(52) U.S. Cl. ..................................................... 713/323
(58) Field of Search ................................ 713/300, 323, 713/324; 323/222

(56) References Cited

U.S. PATENT DOCUMENTS

| | | | | |
|---|---|---|---|---|
| 4,630,230 A | * | 12/1986 | Sundet | 711/169 |
| 5,341,085 A | * | 8/1994 | Ettes | 323/222 |
| 6,178,516 B1 | * | 1/2001 | Meade | 713/300 |
| 6,308,251 B1 | * | 10/2001 | Hashiguchi | 712/16 |
| 6,308,291 B1 | * | 10/2001 | Kock et al. | 714/729 |
| 6,385,688 B1 | * | 5/2002 | Mills et al. | 711/103 |
| 6,430,692 B1 | * | 8/2002 | Kimble et al. | 713/300 |

FOREIGN PATENT DOCUMENTS

JP          07030587 A  *  1/1995  ........... H04L/12/66

OTHER PUBLICATIONS

Ned Carlson—"Plate Voltages: Why?"—Jan. 10, 1998—Newsgroups: rec.audio.tubes.*

* cited by examiner

*Primary Examiner*—Thomas Lee
*Assistant Examiner*—Thuan Du
(74) *Attorney, Agent, or Firm*—Fish & Richardson P.C.

(57) ABSTRACT

A computer processor includes a plurality of storage elements, such as logic gates and flip-flops, that are interconnected in a first configuration during normal operation of the processor. A plurality of selector elements connected to the storage elements are used to rearrange the storage elements into a second configuration upon entry into a low-power mode of operation. In general, the storage elements, when rearranged into the second configuration, form a chain through which data passes serially for storage in a storage device, such as a memory device or a hard drive.

23 Claims, 4 Drawing Sheets

SYSTEM FOR REARRANGING PLURALITY OF MEMORY STORAGE ELEMENTS IN A COMPUTER PROCESS TO DIFFERENT CONFIGURATION UPON ENTRY INTO A LOW POWER MODE OF OPERATION

TECHNICAL FIELD

The invention relates to power management in a computer system.

BACKGROUND

The manufacturers of personal computers, particularly portable computers, strive to reduce both component size and power consumption in these computers. The sizes of the transistors used to form computer components tend to decrease by approximately 70% every 18 months. However, as component sizes decrease, the leakage current increases. This can increase total power consumption associated with these components increases. In general, the power consumption caused by leakage current increases by a factor of approximately ten with each 70% decrease in component size.

One technique for reducing power consumption in a computer involves reducing the frequency at which the computer's processor is clocked when the processor is idle. Using current manufacturing techniques, the amount of leakage current in a processor is very small in comparison to the amount of power consumed in clocking the processor's storage elements. Therefore, reducing the processor's clocking frequency leads to a comparable reduction in power consumption. However, as the components in the processor become even smaller, leakage current will account for a much greater portion of power consumption. As a result, reducing the processor's clocking frequency will produce smaller gains in power consumption than are possible today.

SUMMARY

A computer processor includes a plurality of storage elements, such as logic gates and flip-flops, that are interconnected in a first configuration during normal operation of the processor. A plurality of selector elements connected to the storage elements are used to rearrange the storage elements into a second configuration upon entry into a low-power mode of operation.

In general, the storage elements, when rearranged into the second configuration, form a chain through which data passes serially for storage in a storage device, such as a memory device or a hard drive.

Other embodiments and advantages will become apparent from the description and claims that follow.

DETAILED DESCRIPTION

Figure 1:
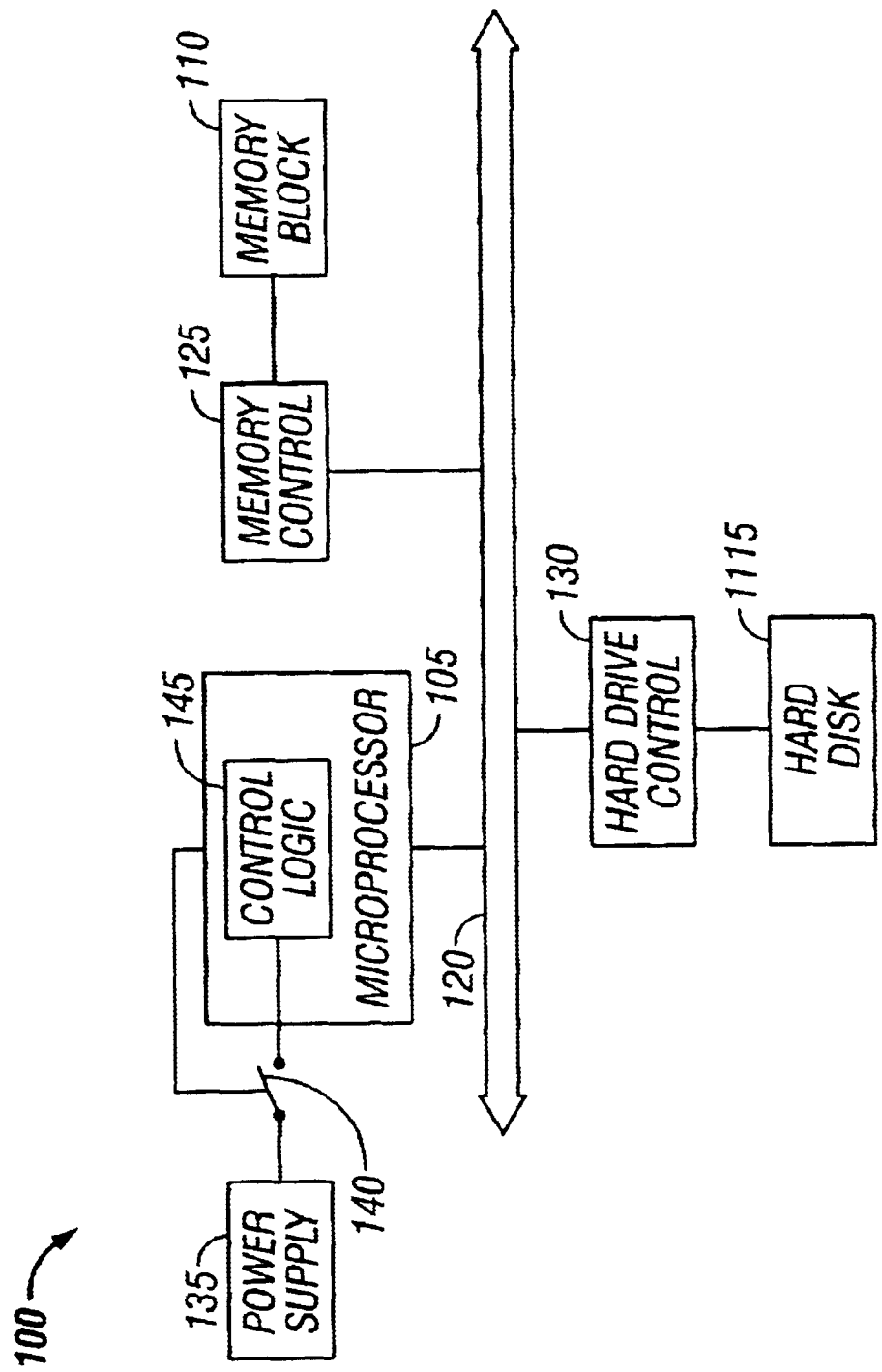
FIG. 1 is a block diagram of a computer system in which the processor loses power when idle.

FIG. 1 shows a computer system 100 that reduces power consumption by removing power from its processor 105 at times when the processor 105 is idle. In addition to the processor 105, the computer 100 includes a volatile storage device, such as random access memory (RAM) device 110, and a non-volatile storage device, such as a hard disk 115, both coupled to the processor 105 through one or more data buses 120. A memory controller 125 and a hard drive controller 130 control the flow of data into and out of the memory device 110 and the disk drive 115, respectively.

A power supply 135 connects to the processor 105 through a switching element 140. Control circuitry 145 in the computer 100 controls the state of the switch 140. In many embodiments, at least some portion of the control circuitry resides in the processor 105 itself.

In general, the computer 100 removes power from the processor 105 any time that the processor 105 has remained idle for some minimum time interval. Reducing the duration of this interval increases the computer's overall power savings. The computer 100 stores the processor's operating state before removing power from the processor 105. This ensures that processing resumes where halted when power is restored. To minimize the impact of this power-saving technique on the computer user, the computer must store and restore the processor state as quickly as possible upon removing and restoring power to the processor 105.

Figure 2:
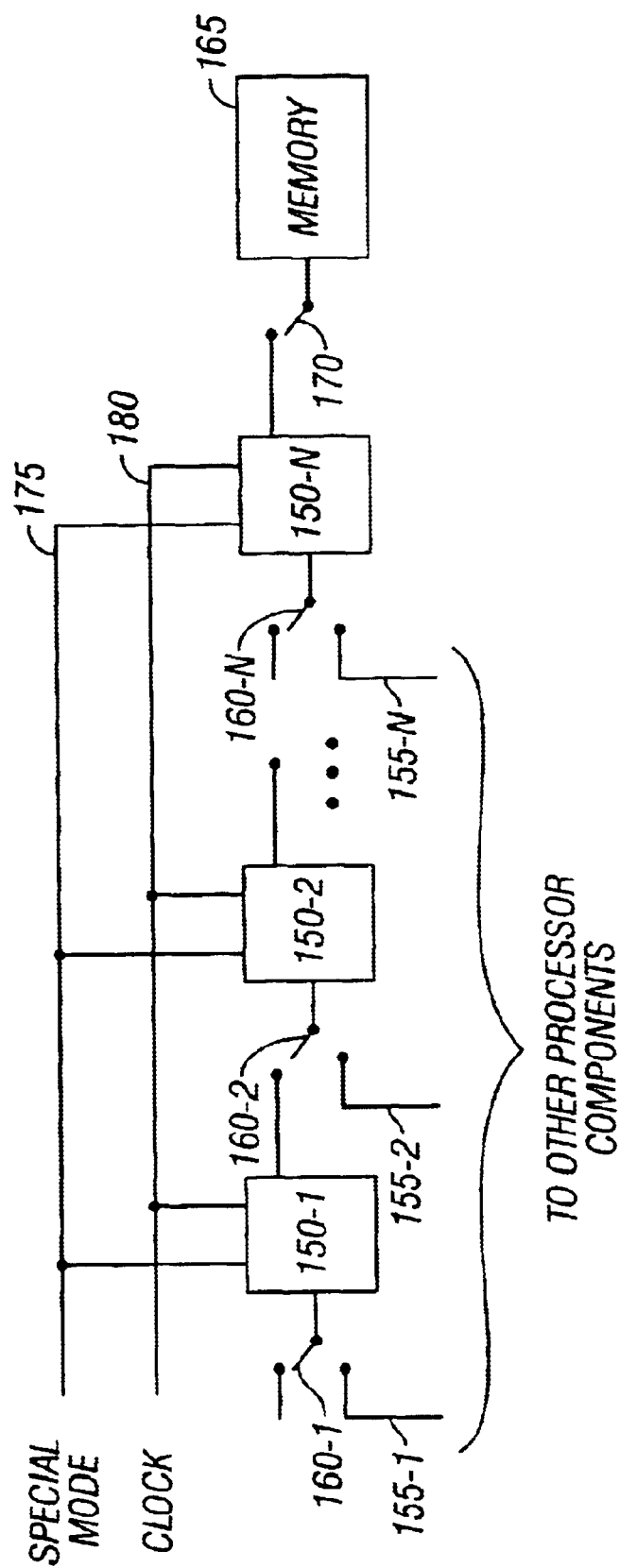
FIGS. 2 and 3 are schematic diagrams illustrating techniques for quickly storing and restoring a processor's operating state upon removing power from and restoring power to the processor.

FIG. 2 shows a block diagram of a structure that allows for quickly storing the processor state when entering a reduced-power mode. The processor 105 includes a plurality of storage elements 150-1, 150-2, . . . , 150-N, such as logic gates and flip-flops, that process incoming data and generate corresponding output. These storage elements are interconnected in a manner that allows the processor 105 to carry out its normal functions. Each storage element normally receives input from at least one of the other storage elements over a corresponding primary input line 155-1, 155-2, . . . , 155-N.

Each storage element 150-1, 150-2, . . . , 150-N also includes a switching element 160-1, 160-2, . . . , 160-N that is connected to an input source of a corresponding storage element. The connection to the storage element is changed just before power is removed from the processor 105. In particular, the computer connects the storage elements in a chain by connecting the input of each storage element to the output of an adjacent storage element. Another switching element 170 connects the last storage element in the chain, 150-N to a storage device 165, such as RAM or a hard disk. This allows the storage elements in the processor to function like a shift register, passing their contents serially through the chain and into the storage device 170.

The state of each of the storage elements is stored just before power is removed from the processor 105. The control circuitry 145 (FIG. 1) asserts a signal on a control line 175 to force the switching elements to change states. A clock line 180 provides a clocking signal that causes each storage element to pass its contents to the next element in the chain.

When power is restored to the processor 105, the switching elements again connect the storage elements to form a chain. The first storage element 150-1 in the chain is connected to receive the stored data from the storage device 165 and to pass it serially through the chain, as described below.

Figure 3:
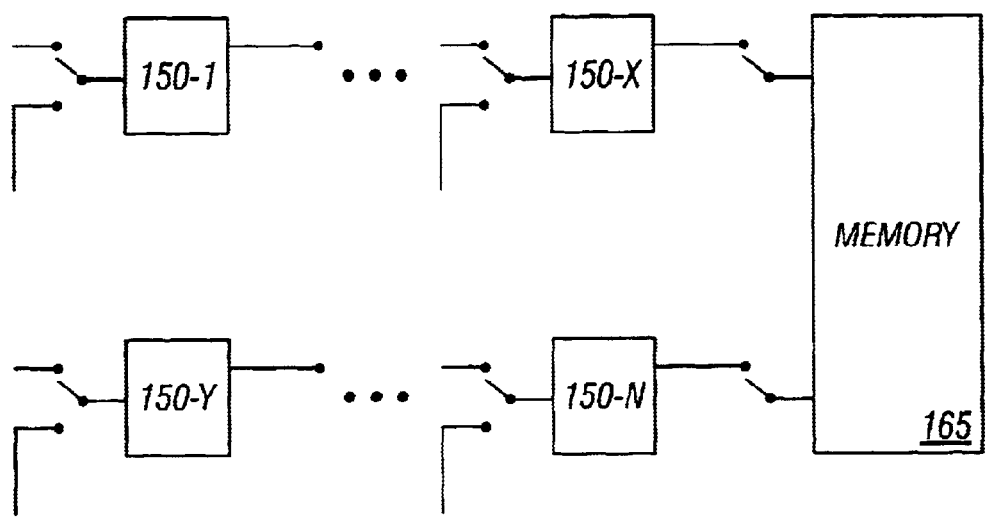

FIG. 3 shows another configuration, in which the storage elements are arranged into parallel chains. The last storage element 150-X, 150-N in each chain connects to the storage device 165. This configuration increases the speed of storing and retrieving the state, by separating the contents of the storage elements into smaller streams and storing these streams in parallel.

Figure 4:
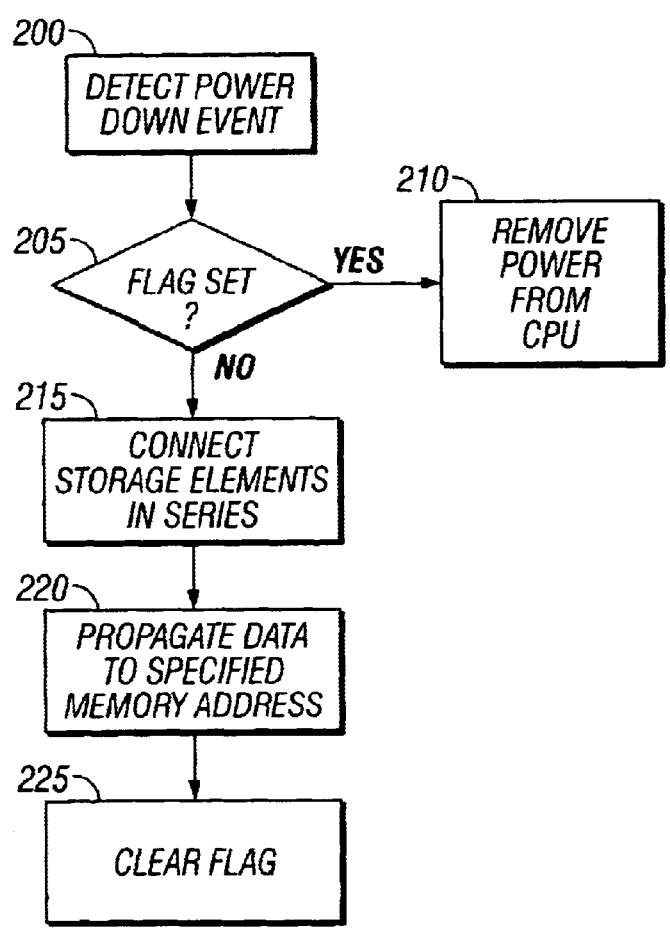
FIGS. 4 and 5 are flow charts illustrating techniques for quickly storing and restoring a processor's operating state upon removing power from and restoring power to the processor.

FIG. 4 illustrates a sequence for use in removing power from the processor. Upon receiving a power-down event, such as a signal indicating that the processor has been idle for a particular amount of time or a general instruction to enter a reduced-power mode (step 200), the control circuitry checks the state of a flag that indicates whether the processor state has changed since the last restore operation (step 205). In general, the flag is cleared at the end of each store operation and is set when the processor next changes states. If the processor has remained idle since the last restore, the control circuitry asserts a control signal that causes the removal of power from the processor (step 210).

If the processor state has changed since the last restore operation, the control circuitry arranges the storage elements into a serial chain (step 215). The data contained in each storage element then propagates through the chain and into a storage device (step 220). In general, the data is stored at a prescribed memory location so that the processor can retrieve the data quickly and easily when power is restored. The control circuitry then clears the flag that indicates whether the processor has changed states since the last restore operation (step 225).

Figure 5:
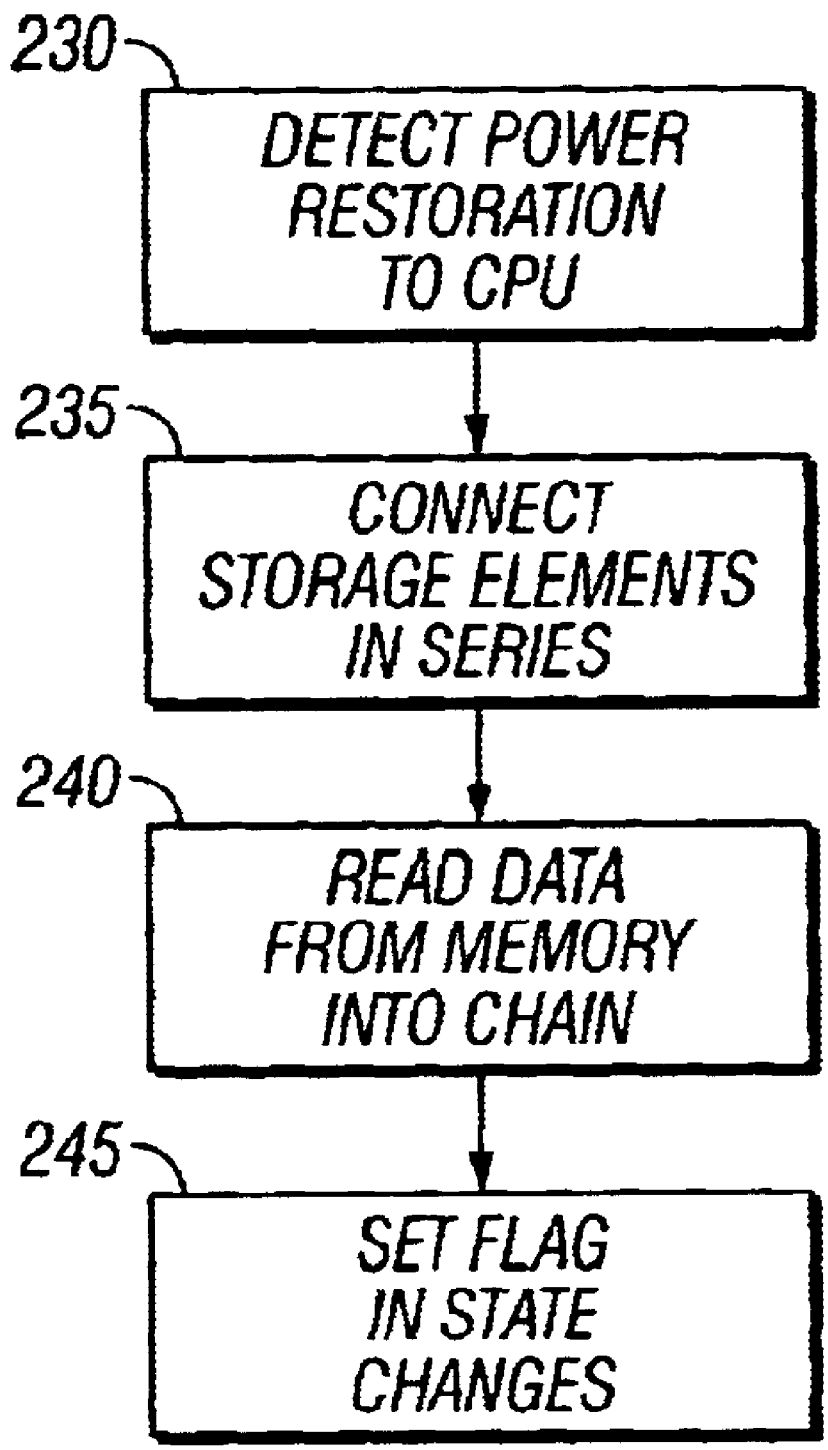

FIG. 5. illustrates a sequence for use in restoring power to the processor. Upon detecting the restoration of power to the processor (step 230), the control circuitry arranges the storage elements into a serial chain (step 235). The processor also connects the first storage element in the chain to receive the stored data from the storage device. The stored data is read from the specified storage location and passed through the chain to the appropriate storage elements (step 240). The control circuitry then monitors the storage elements for a change in processor state and, upon detecting a change in state, sets the flag (step 245).

A number of embodiments have been described. Nevertheless, one of ordinary skill will understand that variations are possible. For example, some embodiments use clocking signals of particular frequencies instead of switching elements to pass data from the storage elements to the storage device. Also, some embodiments use standard tables in the processor, such as the standard "branch history table" (BHT), to distinguish between essential and non-essential data and to store only the essential data upon entering the reduced-power mode. Accordingly, other embodiments are within the scope of the following claims.

What is claimed is:

1. A computer processor system having:
   a plurality of memory storage elements; and
   interconnection elements, responsive to detecting which of normal operation or low power operation is being carried out by the processor, to interconnect said memory storage elements in a first configuration during normal operation of the processor and to connect the memory storage elements in a second configuration upon entry into said low-power mode of operation by the processor.

2. The system of claim 1, wherein the interconnection elements are connected to inputs of the memory storage elements.

3. The system of claim 2, wherein the interconnection elements are operable to connect the memory storage elements in at least one series-connected chain, where an input of each memory storage element is connected to an output of one adjacent memory storage element during at least one of said configurations.

4. The system of claim 3, further comprising a storage device, and a switching element operable to connect a final memory storage element in the chain to said storage device.

5. The system of claim 4, further comprising a clocking signal line connected to the memory storage elements to cause data in the memory storage elements to pass serially through the chain and into the storage device.

6. The system of claim 3, further comprising a switching element operable to connect an initial memory storage element in the chain to a storage device.

7. The system of claim 6, further comprising a clocking signal line connected to the memory storage elements to cause data in the storage device to enter the first memory storage element and then pass serially through the chain.

8. The system of claim 2, wherein the interconnection elements are operable to connect the memory storage elements to form a plurality of parallel connected chains.

9. The system of claim 8, further comprising a storage device, a plurality of additional switching elements, each operable to connect a final memory storage element in one of the chains to deliver data to said storage device.

10. The processor of claim 8, further comprising a plurality of switching elements, each operable to connect an initial memory storage element in one of the chains to receive data from a storage device.

11. The processor of claim 1, further comprising a control circuit connected to deliver a control signal that activates the interconnection elements.

12. The processor of claim 11, where the control circuit is configured to assert the control signal just before power is removed from the processor.

13. The processor of claim 11, where the control circuit is configured to assert the control signal just after power is restored to the processor.

14. A method for use in a computer system having a processor, the method comprising:
    arranging a plurality of memory storage elements in the processor into a first configuration during normal operation of the processor; and
    rearranging the memory storage elements into a second configuration upon entering a low-power mode of operation of the processor.

15. The method of claim 14, wherein said rearranging the memory storage elements includes interconnecting the memory storage elements to form at least one series-connected chain.

16. The method of claim 15, further comprising passing data serially through the chain into a storage device.

17. The method of claim 16, further comprising removing power from the processor after passing data serially through the chain.

18. A method comprising:
    restoring power to a processor;
    arranging a plurality of memory storage elements in the processor into a first configuration in which the memory storage elements form a chain;
    loading data from a storage device into a first memory storage element in the chain; and
    passing the data through the chain.

19. The method of claim 18, further comprising thereafter rearranging the memory storage elements into a second configuration for normal operation of the processor.

20. A computer system comprising:
    a processor having a plurality of memory storage elements; and interconnection elements, responsive to detecting which of normal or low power operation is being carried out by the processor, to interconnect said memory storage elements in a first configuration during normal operation of the processor and to connect the memory storage elements in a second configuration upon entry into said low-power mode of operation of the processor and a storage device coupled to exchange data with the processor;

a power supply connected to supply power to the processor during the normal operation and to withhold power from the processor during the low-power mode of operation.

21. The system of claim 20, wherein the interconnection elements are operable to arrange the memory storage elements into a chain.

22. The system of claim 20, further comprising at least one additional interconnection element operable to connect a final memory storage element in the chain to the storage device.

23. The system of claim 22, further comprising a clocking signal connected to cause data to pass serially through the chain and into the storage device.

* * * * *